Figure 1:
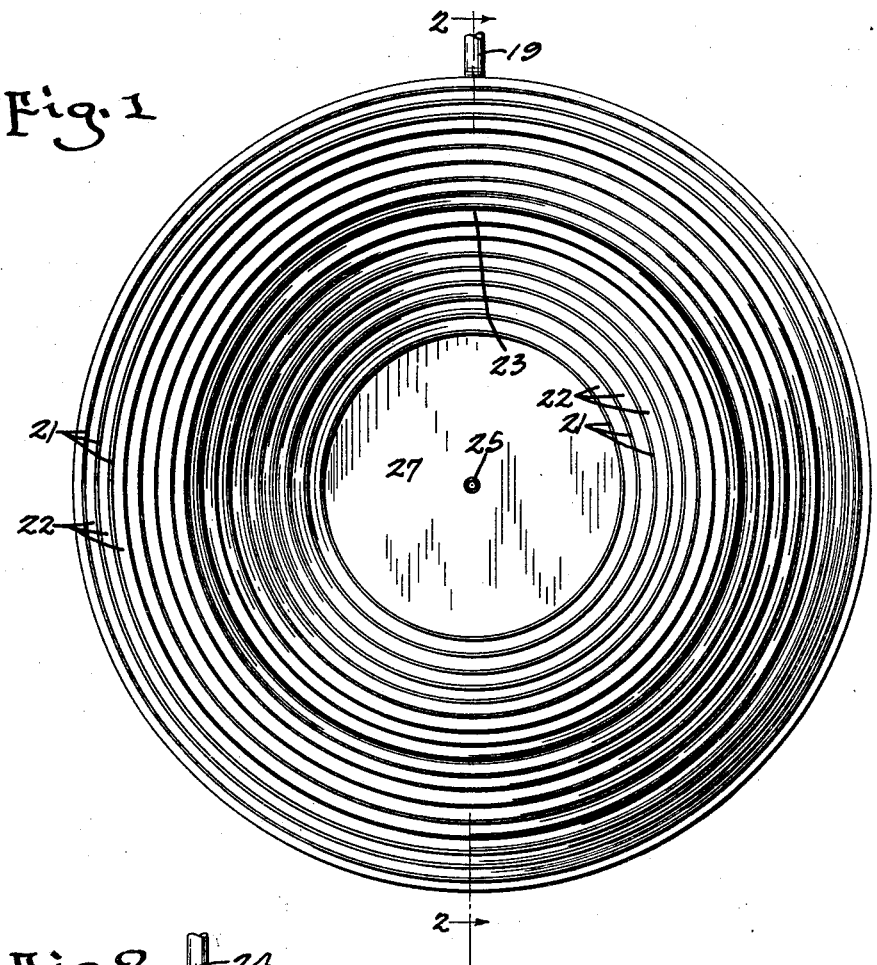

May 10, 1932.   J. ROEMER   1,858,061

EVAPORATOR

Filed May 6, 1929

Julius Roemer
Inventor by Smith and Freeman
Attorneys

Patented May 10, 1932

1,858,061

UNITED STATES PATENT OFFICE

JULIUS ROEMER, OF LAKEWOOD, OHIO

EVAPORATOR

Application filed May 6, 1929. Serial No. 360,965.

My invention relates to air moistening devices, and more particularly to evaporators for use in humidifying the atmosphere of living and working rooms, and has special reference to the provision of combined room heating and air moistening devices. The objects of the invention are the provision of an evaporator so constructed as to exhibit a very large surface for evaporation coupled with a comparatively small space occupied so as to produce an adequate amount of evaporation at a comparatively low temperature thus enabling the requisite degree of air moistening without an undue amount of air heating or requiring an unduly high temperature of the heating appliance. Further objects and advantages of the invention will become apparent as the description proceeds.

My tests have indicated that the time-honored custom of placing a jar of water on a steam radiator is little more than a gesture, since even a large tray does not give off sufficient vapor under some conditions. In addition the most successful heating systems are those in which radiators of considerable size are maintained at a rather moderate temperature, since all attempts to employ small radiators at high temperature are wasteful of heat and productive of unpleasant odors and poor heat distribution. The amount of evaporation, however, depends both upon the temperature maintained and the liquid surface exposed and with any decrease of temperature an increase in the surface exposed becomes necessary. In the present application I have set forth one desirable mode of reconciling these two divergent requirements.

Figure 2:
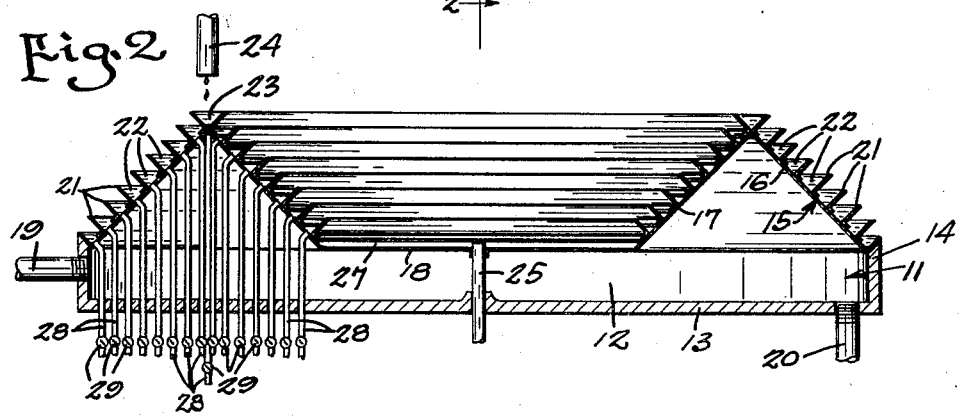

In the drawings accompanying this specification and forming a part of this application I have shown, for purposes of illustration, one form which my invention may assume, and in these drawings:

Figure 1 is a top plan view of this illustrative embodiment of my invention, while Figure 2 is a section taken on the line 2—2 of Figure 1.

The greatest efficiency of an evaporator is attained by spreading the liquid to be evaporated over the greatest possible surface, and in furtherance of this principle I have discovered that a sloping wall provided with a series of parallel fins providing horizontally disposed troughs, each adapted to overlie the next succeeding one below, provides evaporating areas which in the aggregate areas are substantially greater than the horizontal area subtended by said wall, and therefore provides a simple and effective evaporator.

I show my invention as applied to an evaporator 11 having a steam chamber 12 comprising a flat circular bottom member 13 and a perpendicular side wall 14 arising from the outer periphery of the bottom member 13 and supporting on its upper edge a steam chamber cover 15 having a sloping circular outside wall 16 suitably mounted on the top edge of the outside wall 14 and sloping toward the center of the evaporator 11 at an angle of approximately 45° to the bottom member 13 of the steam chamber 12, while a corresponding circular sloping inside wall 17 joining the top periphery of the outside wall 16 at an angle of approximately 90° extends downwardly therefrom to a flat circular top member 18. I find that the outside wall 16, the inside wall 17, and the top member 18, forming together the cover 15 for the steam chamber 12, may be integrally formed, and may be spun into the proper shape, or it may be cast in one piece.

The evaporator 11 is designed to be heated by stem introduced into the steam chamber 12 through a steam inlet duct 19 in the side wall 14 while an outlet duct 20 in the bottom member 13 provides a convenient outlet for the steam chamber 12. The evaporator 11 also may conveniently be used in connection with a hot air heating apparatus and when it is thus used the steam chamber 12 may be eliminated so that the evaporator may be suitably heated by placing it directly on the hot air heating apparatus.

A plurality of parallel fins 21, suitably secured to the upper surfaces of the outside wall 16 and of the inside wall 17 and extending completely therearound, are positioned thereon at substantially an angle of 90° thereto and define horizontally disposed troughs 22 disposed one above the other and adapted to receive a liquid to be evaporated therein which may be introduced into a top trough 23 through an inlet duct 24. The liquid chamber 27 defined by the circular top member 18 of the steam chamber 12 and the inside wall 17 is provided with an overflow duct 25 extending a short distance into the liquid chamber 27 above the circular top member 18 thereby providing a means for carrying away any surplus liquid accumulating in the liquid chamber 27 yet without draining the liquid chamber 27.

In operation, liquid to be evaporated is introduced into the top trough 23 through the inlet duct 24 and such liquid will first fill such top trough 23 and then as additional liquid is introduced will spill over the edges of the trough 23 into the next succeeding troughs 22 below. These will in turn become filled and will overflow and this operation will be repeated until all the troughs 22 are filled and are overflowing. On account of the pitch of the sloping walls 16 and 17 and the pitch of the fins 21 thereon the troughs 22 will provide evaporating troughs of considerable area and the combined evaporating areas of such troughs is substantially greater than the horizontal area subtended by the walls 16 and 17. It readily will be apparent that either the inside wall 17 or the outside wall 16 may be used independently under certain circumstances, also that the evaporator may be any shape, square, oval, rectangular, straight, curved, or otherwise.

The use of ducts 28 and valve means 29 connected to the bottoms of the different troughs serves to enable the evacuation of the liquid contents promptly at any time.

It will be apparent to those skilled in the art that the invention herein shown and described may be variously changed, modified, or used all without departing from the spirit of my invention or sacrificing the advantages thereof, and it therefore will be understood that the disclosure herein is illustrative only, and that my invention is not limited thereto.

I claim:

1. An air moistening device for combined air heating and humidifying apparatus comprising a metal wall, means for applying heat to one face of said wall, the other face of said wall being exposed to atmospheric contact and formed with outwardly projecting fins, each of said fins having an upturned lip between which and the face of said plate is defined a liquid trough which partially underlies the fin next above, each of said lips extending horizontally from one end thereof to the other whereby liquid introduced into the top trough will fill such top trough and then overflow into the troughs below, means closing the ends of said troughs, and means for introducing water into the top trough.

2. An air moistening device for living and working rooms comprising: two upwardly converging intersecting walls; a series of fins disposed on each wall forming a series of troughs each positioned to underlie the trough next above, whereby liquid introduced into the top trough of each wall will fill such top trough and then overflow into the troughs below, and the liquid contained in said troughs is spread over areas totalling substantially greater than the combined horizontal areas subtended by both said walls; mean for introducing water into the such top trough of said walls and means for applying heat to the opposite faces of said walls.

3. An air moistening device for living and working rooms comprising: two upwardly converging sloping walls; a series of fins disposed on each wall forming a series of troughs, each positioned to underlie the trough next above, and a liquid conduit connecting the top troughs of said walls, whereby liquid introduced into said common top trough will fill said top trough and then overflow into the troughs below, and the liquid contained in said troughs is spread over areas totalling substantially greater than the combined horizontal areas subtended by both said walls; means for introducing water into said common top trough and means for applying heat to the opposite faces of said walls.

4. A combined air heater and air moistener for heating and conditioning the air of living and working rooms comprising in combination a hollow metal element having a part of its external wall exposed to the atmosphere in heat exchanging relation and having another part of its external wall provided with vertically spaced, horizontally extending, outwardly projecting fins, each of said fins having an upturned outer margin which defines, with the adjacent face of said element, a liquid receiving trough which underlies in part the fin next in order above the same, whereby liquid introduced into the top trough will first fill such top trough and then overflow into the troughs below and the liquid contained in said troughs is spread over areas totalling substantially greater than the superficial area of that face of the element whereby said remains are carried: means for introducing water in such top trough and means for supplying heating fluid to the interior of said element.

5. An evaporator comprising: two upwardly converging intersecting annular walls; a series of annular fins disposed on each annular wall forming a series of annular troughs each positioned to underlie the trough next above, whereby liquid introduced into the top trough of each annular wall will fill such top trough and then overflow into the troughs below, and the liquid contained in said troughs is spread over areas totalling substantially greater than the combined horizontal area subtended by both said walls; and means for introducing water into such top trough of said walls.

6. A combined air heating and air moistening device for living and working rooms comprising a chambered metal structure having an externally exposed portion for transmitting heat to the atmosphere, and also having an upwardly facing slanting surface; a series of fins disposed on said slanting surface forming a series of troughs, each positioned to similarly underlie the trough next above, and disposed so that the top trough is common to both said walls, whereby liquid introduced into the top trough will fill said top trough and then overflow into the troughs below, and the liquid contained in said troughs is spread over areas totalling substantially greater than the combined horizontal areas subtended by said walls; means for introducing water into said common top trough, means for introducing a heating medium into the interior of said chambered structure.

7. An air moistening device for air heating systems comprising an upwardly and laterally facing sloping wall, a series of fins on said wall disposed at an angle to the horizontal substantially equal to the angle of said wall to the horizontal and forming a series of troughs each positioned to underlie the trough next above, whereby liquid introduced into the top trough will fill said top trough and then overflow into the troughs below, and the liquid contained in said troughs is spread over areas totalling substantially greater than the horizontal area subtended by said wall; means for introducing water into the top trough, and means for heating the face of said wall which is opposite said fins.

8. An evaporator comprising: two upwardly converging intersecting annular walls; a series of annular fins on each annular wall, disposed at an angle to the horizontal substantially equal to the angle to the horizontal of that said wall, forming on each said wall a series of annular troughs each positioned to underlie the trough next above, whereby liquid introduced into the top trough of each annular wall will fill such top trough and then overflow into the troughs below, and the liquid contained in said troughs is spread over areas totalling substantially greater than the combined horizontal areas subtended by both said walls; and means for introducing liquid into such top trough of said walls.

9. An air moistening device for combined air heating and humidifying apparatus comprising a metal wall, means for applying heat to one face of said wall, the other face of said wall being exposed to atmospheric contact and formed with outwardly projecting fins, each of said fins having a marginal horizontal lip between which and the face of said plate is defined a liquid trough which partially underlies the trough next above and partially overhangs the trough next below, whereby liquid introduced into the topmost trough will fill the same and then overflow into the troughs below, and valved duct-means communicating with the bottoms of said troughs whereby the liquid contents thereof can be evacuated promptly at any time.

10. An air moistening device for combined air heating and humidifying apparatus comprising a metal wall, means for applying heat to one face of said wall, the other face of said wall being exposed to atmospheric contact and having thereon a plurality of horizontal troughs adapted for the reception of water to be evaporated, and valved duct-means communicating with the bottoms of said troughs whereby the liquid contents thereof can be evacuated promptly at any time.

11. An air moistening device comprising in combination a plurality of horizontal troughs for the reception of water to be evaporated, means for supplying heat to said troughs, and valved duct-means communicating with the bottoms of said troughs whereby the liquid contents thereof can be evacuated promptly at any time.

In testimony whereof I hereunto affix my signature.

JULIUS ROEMER.